United States Patent [19]

Hergenrother et al.

[11] Patent Number: 4,558,103

[45] Date of Patent: Dec. 10, 1985

[54] POLYPHOSPHAZENE POLYMERS CONTAINING DIALLYAMINO SUBSTITUENTS

[75] Inventors: William L. Hergenrother, Akron; Adel F. Halasa, Bath, both of Ohio

[73] Assignee: The Firestone Tire & Rubber Company, Akron, Ohio

[21] Appl. No.: 693,443

[22] Filed: Jan. 22, 1985

[51] Int. Cl.[4] .................. C08G 79/02; C08G 79/04
[52] U.S. Cl. ................... 525/538; 528/167; 528/168; 528/398; 528/399
[58] Field of Search ............ 525/538, 535; 528/167, 528/168, 398, 399

[56] References Cited

U.S. PATENT DOCUMENTS

| | | | |
|---|---|---|---|
| 3,271,330 | 9/1966 | Evans | 525/538 |
| 3,515,688 | 6/1970 | Rose | 525/538 |
| 4,053,456 | 10/1977 | Dieck et al. | 525/538 |
| 4,175,181 | 11/1979 | Hergenrother et al. | 528/168 |
| 4,218,556 | 8/1980 | Hergenrother et al. | 528/168 |
| 4,221,899 | 9/1980 | Hergenrother et al. | 528/168 |
| 4,221,904 | 9/1980 | Hergenrother et al. | 528/168 |
| 4,223,102 | 9/1980 | Hergenrother et al. | 528/168 |
| 4,225,697 | 9/1980 | Hergenrother et al. | 528/168 |
| 4,242,491 | 12/1980 | Hergenrother et al. | 528/168 |

Primary Examiner—Lester L. Lee
Attorney, Agent, or Firm—Frank J. Troy, Sr.

[57] ABSTRACT

Polyphosphazene polymers are prepared which contain repeating units represented by the formulas:

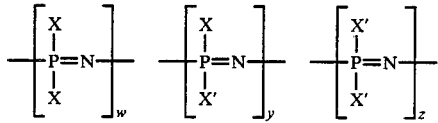

wherein X is $-N(CH_2CHCH_2)_2$, and X' is a substituted or unsubstituted alkoxy, aryloxy, amino or mercapto substituent group or mixtures thereof which are compatible with diallylamino substituent and are known in the state of the art of polyphosphazene technology; and $20 \leq (w+y+z) \leq 50,000$ per polymer and $(y+z) > 0$.

The polymers of the invention can be utilized to form protective films and can also be utilized in applications such as for molding, coatings, foams and the like.

7 Claims, No Drawings

POLYPHOSPHAZENE POLYMERS CONTAINING DIALLYAMINO SUBSTITUENTS

BACKGROUND OF THE INVENTION

Polyphosphazene polymers containing repeating

—P=N— units in which various substituted and unsubstituted alkoxy, aryloxy, amino and mercapto groups are attached to the phosphorus atom and their method of preparation are described in the prior art as illustrated in the publication "Nitrogen-Phosphorus Compounds," Academic Press, New York, N.Y., 1972 by H. R. Allcock and "Poly(Organophosphazenes)," Chemtech, Sept. 19, 1975, by H. R. Allcock and in such U.S. Pat. Nos. 3,515,688; 3,702,833; 3,856,712; 3,974,242; and 4,042,561; the disclosures of which are herein incorporated by reference.

However, none of the aforementioned publications and patents or for that matter, none of the prior art of which applicants are aware, disclose or suggests polyphosphazene copolymers containing diallylamino substituents attached to the phosphorus atom or methods of preparing such polymers.

SUMMARY OF THE INVENTION

This invention relates to polyphosphazene copolymers containing repeating

—P=N— units in the polymer chain in which diallylamino substituents are attached to the phosphorus atom. More particularly, the invention relates to polyphosphazene polymers having substituents derived from a diallylamine which are attached to the phosphorus atom and to a method of preparing such polymers. Any substituent groups such as alkoxy, aryloxy, amino and mercapto groups which are known in the polyphosphazene state of the art can be substituted onto the polyphosphazene in addition to the diallylamino substituents. These substituents may be substituted onto the polyphosphazene by the method disclosed in the present invention or by prior art methods.

DETAILED DESCRIPTION OF THE INVENTION

The polymers of the invention contain repeating units represented by the formulas:

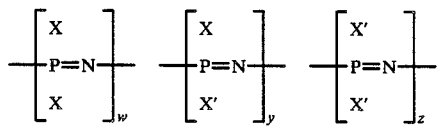

wherein X is —N(CH$_2$CHCH$_2$)$_2$ and X' is a substituted or unsubstituted alkoxy, aryloxy, amino or mercapto substituent group or mixtures thereof which are compatible with a diallylamino substituent and are known in the state of the art of polyphosphazene technology; and $20 \leq (w+y+z) \leq 50,000$ per polymer and $(y+z) > 0$. When X' is a substituted substituent, the various substituents which are substituted onto the alkoxy, aryloxy, amino or mercapto group may be any "non-reactive" substituent, i.e., a substituent which is non-reactive with the various materials present during polymer formation. Suitable substituents include alkyl, chlorine, bromine, nitro, cyano, phenoxy, alkoxy, and the like.

In the polymer units represented by the above formulas all X' substituent groups can be the same or mixtures of alkoxy, aryloxy, amino and mercapto groups.

The phosphazene polymers of the invention can be represented by the formula:

[NP(X)$_a$(X')$_b$]$_{n'}$ wherein n' is from 20 to 50,000 and $a+b=2$ and a and b are greater than zero.

The copolymers of the instant invention are desirable for formulations where the presence of crosslinking functionality is desired. These copolymers contain excellent cure sites to be cured either by means of allylic hydrogen abstraction or addition to the unsaturated bond yielding a linear or cyclic crosslink site.

The specific proportion of X to X' substituent groups incorporated in the copolymers of the invention can vary considerably depending upon chemical and physical properties desired in the copolymer and the particular end use application for which the copolymer is intended. Thus, for applications such as moldings, coatings, foams, and the like the copolymer should contain the diallylamino substituents in an amount between 0.1 mole % to about 50 mole % and preferably between 0.5 mole % and about 20 mole % based on the replaceable chlorine in the starting poly(dichlorophosphazene).

The term polymer herein includes within its meaning copolymer, that is, polymer units containing more than one substituent in a non-repeating manner.

The polymers can be used to prepare protective films and may be utilized in applications such as moldings, foams, coatings, and the like.

METHOD OF PREPARATION

The polymers are prepared by reacting a poly(dichlorophosphazene) having the formula —(NPCl$_2$)$_{n''}$—, in which n'' is from 20 to 50,000, in the presence of a tertiary amine with a mixture of a diallylamine with any compound which is reactive with the poly(dichlorophosphazene) to form a substitution group on a phosphorus atom in the poly(dichlorophosphazene) which is known in the state of the art. Examples of such compounds are discussed in the section entitled "Additional Reactive Compounds" below.

I. THE POLY(DICHLOROPHOSPHAZENE) POLYMER

Poly(dichlorophosphazene) polymers which are employed as starting materials in the process of this invention are well known in the art as illustrated in U.S. Pat. Nos. 3,370,020; 4,005,171; and 4,055,520 and the aforementioned publications of H. R. Allcock, the disclosures of which are incorporated herein by reference.

These polymers have the general formula —(NPCl$_2$)$_{n''}$— in which n'' may range from 20 to 50,000 or more. As described in the aforementioned references, the polymers are in general prepared by the thermal polymerization of cyclic oligomers having the formula (NPCl$_2$)$_m$ in which m is an integer from 3 to 7, with the cyclic trimer and tetramer often comprising up up to 90% of the oligomers and the ratio of trimer to tetramer varying with the method of manufacture.

The specific conditions of temperature, pressure and time employed in the thermal polymerization of the cyclic oligomers can vary considerably depending on temperatures may range from about 130° C. to about 300° C., pressure may range from a vacuum of less than about 10−1 Torr to superatmospheric and times may range from 30 minutes to about 48 hours.

A preferred process for preparing the poly(dichlorophosphazene) polymers used in the process of this invention is described in the aforementioned incorporated U.S. Pat. No. 4,005,171.

II. THE SUBSTITUENTS

The sole substituent which is contained in all of the polymers of the instant invention is the diallylamino substituent represented by: —N(CH$_2$—CH=CH$_2$)$_2$ This substituent possesses superior curing functionallity in that it contains two available cure sites per substituent group.

As indicated heretofore, the polyphosphazene copolymers of the invention in addition to the diallylamino substituent groups contain substituted or unsubstituted alkoxy, aryloxy, amino or mercapto groups or mixtures thereof.

Preferred substituent groups represented by X' for use in these copolymers are:

Alkoxy groups (substituted or unsubstituted) derived from aliphatic alcohols having 1 to 20 carbon atoms such as methanol, ethanol, propanol, isopropanol, n-butanol, sec-butanol, hexanol, dodecanol and the like; fluoroalcohols, especially those represented by the formula Z(CF$_2$)$_n$CH$_2$OH in which Z is hydrogen or fluorine and n is an integer from 1 to 10 as illustrated by trifluoroethanol; 2,2,3,3,3-pentafluropropanol; 2,2,3,3,4,4,4-heptafluorobutanol; 2,2,3,3-tetrafluoropropanol; 2,2,3,3,4,4,5,5-octafluoropentanol; 2,2,3,3,4,4,4-heptafluorobutanol; 2,2,3,3-tetrafluoropropanol; 2,2,3,3,4,4,5,5,6,6,7,7-dodecafluoroheptanol and the like. In instances where it is desired to incorporate mixed X' substituent groups in the copolymers, mixtures of the foregoing alcohols may be employed.

Aryloxy groups (substituted or unsubstituted) derived from aromatic alcohols including among others phenol; alkylphenols such as cresols, xylenols, p-,o-, and m-ethyl and propyl phenols and the like; halogen-substituted phenols such as p-,o-, and m-chloro and bromo phenols and di- or tri-halogen substituted phenols and the like; and alkoxy-substituted phenols such as 4-methyoxyphenol; 4-(n-butoxy) phenol and the like. Mixtures of the foregoing aromatic alcohols can also be employed.

Amino groups derived from any of the amino compounds heretofore employed in the polyphosphazene polymer art. Thus, the amino groups can be derived from aliphatic primary and secondary amines such as methylamine, ethylamine, dimethylamine, ethylmethylamine and the like and aromatic amines such as those described in U.S. Pat. No. 4,042,561 (hereby incorporated by reference) as illustrated by aniline, halogen-substituted anilines, alkyl-substituted anilines, alkoxy-substituted anilines and the like.

Mercapto groups derived from any of the mercaptan compounds heretofore employed in the polyphosphazene polymer art. Thus, for example, the mercaptan compounds described in U.S. Pat. No. 3,974,242 to Lanier et al. (hereby incorporated by reference) can be utilized. Representative of suitable mercaptan compounds as described in the aforementioned patent are methyl mercaptan and its homologs, ethyl, propyl, butyl, aryl and hexyl mercaptan, thiophenol, thionaphthols, benzyl mercaptan, cyclohexyl mercaptan and the like.

IV. THE TERIARY AMINE

The use of tertiary amine in preparing the polymers of the invention minimizes undesirable side reactions and at the same time acts as an effective acid scavenger.

Tertiary amine which can be employed in preparing the polymers of the invention are those represented by the general structure:

wherein R$_1$, R$_2$, and R$_3$ can each be alkyl containing from 1 to 8 carbon atoms. Thus, for example, the tertiary amine can be a trialkyl amine such as trimethylamine, triethylamine, tri-isopropylamine, tri-n-propylamine, tri-isobutylamine, tri-n-butylamine and the like. In addition, tertiary amines such as pyridine and those containing diamine groups such as N,N,N',N'-tetramethylethylene diamine (TMEDA) can also be utilized.

The preferred tertiary amines for use in preparing the polymers of the invention are triethylamine; N,N,N',N'-tetramethylethylene diamine; pyridine, N-methyl morpholine; N-methyl pyrrole; 1,4-diazabicyclo (2.2.2) octane (DABCO) and dipiperidyl ethane.

The specific reaction conditions and proportion of ingredients employed in preparing these polymers can vary somewhat depending on factors such as the reactivity of the compound or compounds used to form copolymer substituents, the particular tertiary amine employed, and the degree of substitution desired in the finished polymer. In general, reaction temperatures can range from about 25° C. to about 200° C. and times can range from 3 hours up to 7 days; lower temperatures necessitating longer reaction times and higher temperatures allowing shorter reaction times. These conditions are, of course, utilized in order to obtain the most complete reaction possible, i.e., in order to insure the substantially complete substitution of the chlorine atoms in the polymer with the diallylamino substituent as well as the other copolymer substituents.

The above reaction is ordinarily carried out in the presence of a solvent. The solvent employed in the reaction should be a solvent for the poly(dichlorophosphazene) polymer, the active hydrogen-containing diallylamine as well as the compounds from which the copolymer substituents are derived, and the tertiary amine. Examples of suitable solvents which may be employed include diglyme, triglyme, tetraglyme, cyclohexane, chloroform, dioxane, dioxolane, methylene chloride, toluene, xylene and tetrahydrofuran. The amount of solvent employed is not critical and any amount sufficient to solubilize the reaction mixture materials can be employed. In addition, the materials in the reaction zone should be reasonably free of water. The prevention of substantial amounts of water in the reaction system is necessary in order to inhibit the reaction of the available chlorine atoms in the chloropolymer. Preferably the reaction mixture should contain less than about 0.01% water.

In general, the amount of the combined total of the diallylamine compound and the copolymer forming compounds employed in the process should be at least molecularly equivalent to the number of available chlorine atoms in the polymer mixture. However, preferably a slight excess of such compounds should be employed in order to insure complete displacement of all the available chlorine atoms.

As indicated above, the polymers of the present invention are prepared by reacting a poly(dichlorophosphazene) polymer, diallylamine, and compounds listed in the groups of "Additional Reactive Compounds" which may be substituted onto the poly(dichlorophosphazene) in the presence of a tertiary amine.

While the diallylamino containing poly(phosphazene) polymers of the present invention have been prepared in the above-identified manner, that is, in the presence of a tertiary amine, alternative methods of preparation are available for the other substituents. The prior art methods of poly(dichlorophosphazene) substitution such as the reaction with sodium alkoxide as demonstrated in U.S. Pat. No. 3,370,020, to Allcock et al., may be used to substitute the substituents derived from the compounds listed in the list of additional reactive compounds. These prior art methods may be used to substitute the above-identified substituents onto the poly(dichlorosphazene) or may be used to partially substitute the poly(dichlorophosphazene) with groups other than diallylamino groups whereas the remaining chlorines on the partially substituted poly(dichlorophosphazene) may be replaced with diallylamino groups using the tertiary amine substitution process.

Where the presence of additional crosslinking functionality is desired, crosslinking functionality can be introduced in the polymer molecule through the use of ethylenically unsaturated substituent groups in addition to the groups X and X' set forth above. Examples of suitable crosslinking moieties and methods for their cure are set forth in U.S. Pat. Nos. 4,055,520; 4,061,606; 4,073,824; 4,073,825; and 4,076,658 which are hereby incorporated by reference and include $-OCH=CH_2$ and $-OR_3CF_2$, as well as similar groups which contain unsaturation. Generally, when present, the moieties containing additional crosslinking functionality are usefully present in an amount between 0.1 mole % to about 20 mole % and usually between 0.5 mole % and about 5 mole % based on the replaceable chlorine in the starting poly(dichlorophosphazene).

The following examples are submitted for the purpose of further illustrating the nature of the present scope thereof. Parts and percentages referred to in the examples and throughout the specification are by weight unless otherwise indicated.

EXAMPLE 1

A bottle was charged with 33.1 grams (40.0 millimoles) of a 14 percent solution of poly(dichlorophosphazene) in cyclohexane, 100 cc of dry tetrahydrofuran (hereinafter THF), 5.43 grams (44.0 millimoles) of diallylamine, and 12.3 cc (88 millimoles) of triethylamine. The material in the bottle was heated at 120° C. for 16 hours. Thereafter 3.2 cc (44 millimoles) of trifluoroethanol was charged into the mixture which was then maintained at 120° C. for 84 hours. The product of this time measured an Infrared Spectroscopy $OD_{600-625}$ of 0.228. The triethylamine hydrochloride salt was filtered off from the solution in a dry box. Subsequently 23 cc (44 millimoles) of 1.9 M sodium trifluoroethoxide was added to the solution mixture which was then maintained at 120° C. for a period of 20 hours. Coagulation of the mixture in hexane yielded 7.26 grams of a brown rubbery material having an Infrared Spectroscopy $OD_{600-625}$ of 0.195 (0.204 corrected for dilution).

EXAMPLE 2

A bottle was charged with 33.3 grams (40.2 millimoles) of a 14% solution of poly(dichlorophosphazene) in cyclohexane, 100 cc of dry THF, 5.43 cc (44.0 millimoles) of diallylamine and 12.3 cc (88 millimoles) of triethylamine and heated at 120° C. for a period of 16 hours. Thereafter 4.43 cc (44.0 millimoles) of 4-chlorophenol was added to the mixture and heated at 120° C. for 84 hours. The product at this time measured an Infrared Spectroscopy $OD_{600-625}$ of 0.177. The triethylamine hydrochloride salt was filtered off from the solution in a dry box. Subsequently 23 cc (44 millimoles) of 1.9 M sodium trifluoroethoxide was added to the solution mixture which was heated for a period of 20 hours at 120° C. Coagulation of the mixture in hexane yielded 5.71 of a tan rubbery material having an Infrared Spectroscopy $OD_{600-625}$ of 0.106 (0.146 corrected for dilution).

EXAMPLE 3

A bottle was charged with 178.3 grams (215.5 millimoles) of a 14 percent solution of poly(dichlorophosphazene) in cyclohexane, 225 cc of dry THF, 10.64 cc (86.2 millimoles) of diallylamine, and 12.5 cc (90 millimoles) of triethylamine. The mixture in the bottle was maintained at 25° C. for 3 hours after which triethylamine hydrochloride was filtered off from the solution in a dry box. Thereafter 142.9 cc (300 millimoles) of 2.1 M 4-chloro-sodium phenoxide and 64.5 cc (129 millimoles) of 2.0 M 4-t-butyl-sodium phenoxide was added to the mixture which was then heated for a period of 16 hours at 120° C. Coagulation of the mixture in hexane yielded 40.2 grams of a tan rubbery material which displayed an Infrared Spectroscopy $OD_{600-625}$ of 0.00 which denoted that all of the chlorine substituents from the original poly(dichlorophosphazene) had been removed.

We claim:

1. A polyphosphazene copolymer comprised of units represented by the formulas:

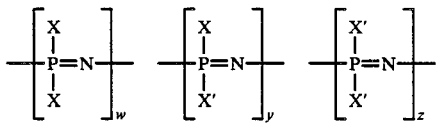

wherein X is $-N(CH_2-CH=CH_2)_2$ and X' is selected from a group consisting of substituted or unsubstituted alkoxy, aryloxy, amino or mercapto substituent group or mixtures thereof; $20 \leq (w+y+z) \leq 50,000$ per copolymer and $(y+z) > 0$.

2. The copolymer of claim 1 wherein X' is $OCH_2CF_3$.

3. The copolymer of claim 1 wherein the X substituent represents 0.1 to 50.0 percent of the total substituents.

4. The copolymer of claim 1 wherein the X substituents represents 0.5 to 20.0 percent of the total substituents.

5. A method of preparing polyphosphazene polymers containing units represented by the formulas:

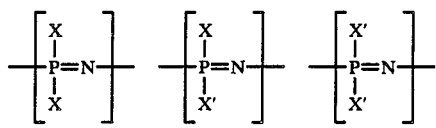

wherein X is —N(CH$_2$—CH=CH$_2$)$_2$ and X' is selected from a group consisting of substituted or unsubstituted alkoxy, aryloxy, amino or mercapto substituent group or mixtures thereof; reacting a poly(dichlorophosphazene) polymer having a formula —(NPCl$_2$)$_{n''}$—, wherein n" is from 20 to 50,000, with a mixture consisting of diallylamine and a substituted or unsubstituted alkanol, aryl alcohol, amine, mercaptan or mixture thereof, in the presence of a tertiary amine.

6. The method of claim 5 wherein the mixture consists of diallylamine and at least one compound selected from the group consisting of trifluoroethanol, 4-chlorophenol and 4-t-butylphenol.

7. The method of claim 5 wherein the tertiary amine is triethylamine.

* * * * *